April 26, 1960 R. L. CALDWELL ET AL 2,934,652
SELECTED SCATTERED GAMMA-RAY DENSITY LOGGING
Filed Aug. 13, 1956 3 Sheets-Sheet 1

RICHARD L. CALDWELL
GUSTAVE L. HOEHN, JR.
TOM W. BONNER
INVENTORS

BY D. Carl Richards
ATTORNEY

April 26, 1960

R. L. CALDWELL ET AL 2,934,652

SELECTED SCATTERED GAMMA-RAY DENSITY LOGGING

Filed Aug. 13, 1956

RICHARD L. CALDWELL
GUSTAVE L. HOEHN, JR.
TOM W. BONNER
INVENTORS

BY D. Carl Richards
ATTORNEY

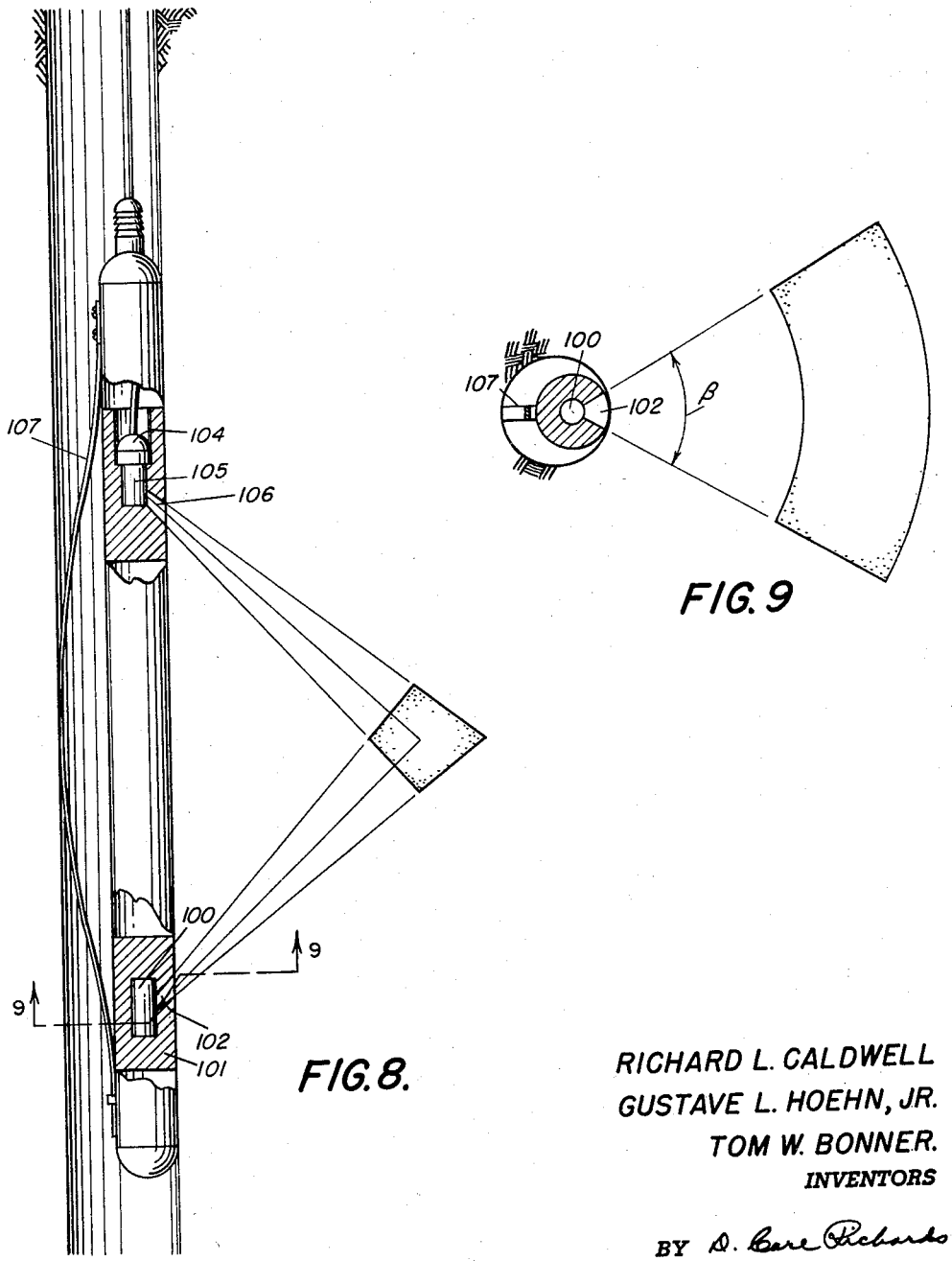

United States Patent Office 2,934,652
Patented Apr. 26, 1960

2,934,652

SELECTED SCATTERED GAMMA-RAY DENSITY LOGGING

Richard L. Caldwell, Dallas, Tex., Gustave L. Hoehn, Jr., Palo Alto, Calif., and Tom W. Bonner, Houston, Tex., assignors, by mesne assignments, to Socony Mobil Oil Company, Inc., New York, N.Y., a corporation of New York Application August 13, 1956, Serial No. 603,776

9 Claims. (Cl. 250—83.6)

It has been found that measurements dependent upon the scattering of gamma-rays from an irradiating source in a borehole may be indicative of the density of the formations. Attempts to utilize this phenomenon in actual practice have been hampered by the presence of gamma-rays not necessarily dependent upon nor controlled by the variations in the density of the formations. Attempts have been made to compensate errors introduced by variations in borehole diameter and the like, but in all prior art systems inherent difficulties have remained as to introduce unwanted character into a record or unreasonably to encumber the necessary apparatus.

The present invention is directed towards the determination of the density of selected zones either in or adjacent a borehole as desired in such a manner that variations in borehole diameter upon logs of density are insignificant. At the same time the equipment necessary is of relatively simple structure.

More particularly in accordance with the present invention, there is provided a system for determining density of materials which includes a source of gamma-rays of intermediate energy together with a detector element for producing electrical signals upon reception of gamma-rays. A heavy metal shielding means is provided to separate the elements, the shielding means having beveled surfaces adjacent the elements such that the geometrical projections of the beveled surfaces intersect at a point spaced from a straight line connecting the source and detector elements such that gamma-rays from the source singly scattered at or adjacent the point of intersection impinge the detector with energies within a band dependent upon the angle subtended by the projections in the relationship $$\gamma' = \frac{\gamma}{1+\gamma(1-\cos\theta)}$$

where $\gamma$ is the energy of the radiation from the source, $\gamma'$ is the energy of the radiations impinging the detector and $\theta$ is the scattering angle of the gamma-rays. A measuring means is then provided, connected to the detector and selectively responsive to signals corresponding to gamma-rays within the defined energy band.

For a more complete understanding of the present invention and for further objects and advantages thereof, reference may now be had to the accompanying drawing in which:

Fig. 1, partially in section, illustrates one embodiment of the invention;

Fig. 8, partially in section, illustrates a further modification of the invention; and Fig. 9 is a sectional view of the system of Fig. 8 taken along the line 9—9 thereof.

Gamma-ray logging techniques are aimed at determining the properties of matter from the interaction with gamma-rays. A beam of gamma-rays passing through matter is exponentially attenuated according to the law:

$$N_{(x)} = N_0 e^{-Jx} \qquad (1)$$

where $N_{(x)}$ is the number of gamma-rays per unit time passing through a unit area perpendicular to the beam at a depth $x$; $N_0$ is the number where $x=0$; and J is the absorption coefficient.

It has been found that although there are several possible causes for removal of quanta from a beam, attenuation occurs principally through the agency of three effects: (1) the photoelectric effect, (2) Compton scattering and (3) pair production. Accordingly, the coefficient J of Equation 1 may be expressed in terms of three components, i.e.:

$$J = J_{\text{photo}} + J_{\text{Compton}} + J_{\text{pair}} \qquad (2)$$

The dominance of each of the partial coefficients of J depends largely upon the gamma-ray or quantum energy. At low energies the photo-electric effects predominate. At intermediate energies Compton scattering is most important and at high energy pair production becomes the dominant process. Applicants have found that in materials such as ordinarily encountered in the earth's crust, principally materials of the light elements, Compton scattering accounts for more than 98% of the total beam absorption for intermediate quantum energies, i.e., in the range of the order of from .25 to 2.00 m.e.v.

The present invention is directed to determination of the degree of gamma-ray or quanta attenuation in the energy range controlled by the Compton scattering in a predetermined zone in or adjacent a well bore and the provision of a system capable of discriminating substantially against attenuation effects other than due to Compton scattering.

Figure 1:
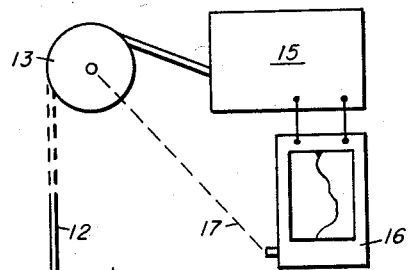
Figure 1:
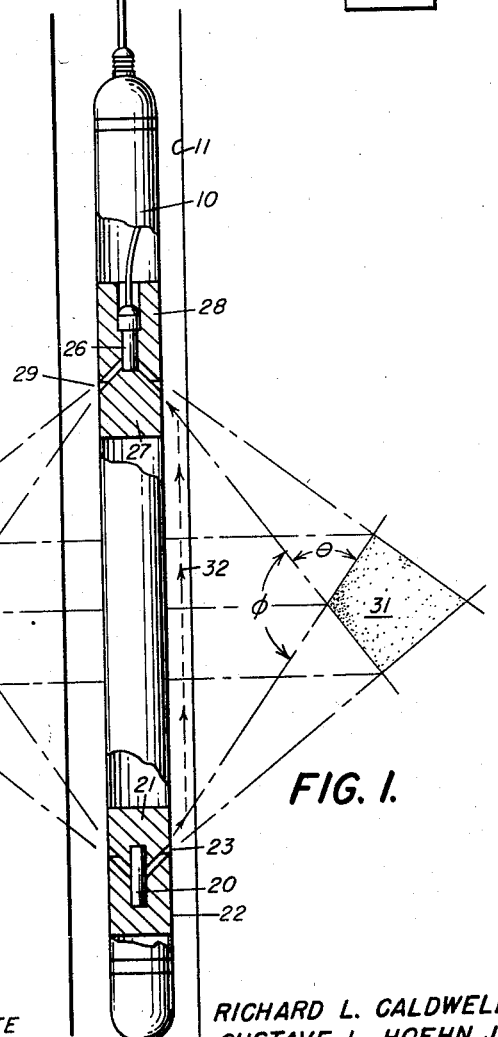

More particularly, Fig. 1 illustrates a well logging system in which a borehole unit 10 is supported in a borehole 11 by a cable 12 suitably driven as by a reel 13 at the earth's surface to move unit 10 along the length of borehole 11. Cable 13 is connected by means well known to those skilled in the art to a measuring unit 15, which is of the energy level discriminating type, whose output is connected to a recorder 16 which in turn is mechanically coupled by link 17 to the drive reel 13 so that the recorder chart length is proportional to depth whereas excursions of the trace perpendicular to the length of the recorder chart are dependent upon the sensed and measured property.

To obtain the desired measurements from the logging unit 10, means are provided for collimation of gamma radiation from a selected source along with collimation of the gamma-ray path to a detector. Combined therewith is the energy level discriminating system 15 in which detection is limited to those gamma-rays having energies in a restricted band wherein the energies are dependent upon the collimation angle. By this means measurements are limited to singly scattered gamma-rays at a selected point relative to source and detector.

More particularly, a source of gamma-rays generically represented by the cylinder 20 extends centrally into the end of an upper cone-shaped shielding member 21 and into the interior of a complementary cone-shaped shielding member 22. The opposed conical-shaped surfaces of members 22 and 23 are spaced apart to leave a symmetrical cone-shaped window 23 through which gamma-rays may travel into the adjacent formations. In the system illustrated in Fig. 1 the walls of window 23 are oriented at an angle of 45° relative to the axis of unit 10. Depending upon the width of the window 23, the gamma-rays may diverge to irradiate a substantially cone-shaped shell of earth materials having geometrical symmetry with respect to source 20.

In the form shown a detector represented by tube 26 is mounted in a cone-shaped collimating device comprising elements 27 and 28 which provides for scanning the irradiated zone, by permitting scattered gamma-rays to reach detector 26 by way of a cone-shaped window 29. It should be noted that the conical shapes of windows 23 and 29 are oppositely directed so that their geometrical projections intersect to define the zone in the formations of primary effect on measurements.

In practice, source 20 preferably comprises a pencil of cesium 137 which emits gamma-rays of energy .662 m.e.v.; cobalt 60 emitting gamma-rays of energies 1.17 m.e.v. and 1.33 m.e.v.; or mercury 203 emitting gamma-rays of .286 m.e.v. Preferably the source has an activity equal to or greater than 200 millicuries. The detector 26 preferably is a scintillation crystal combined with a photo-electric multiplier tube which form the detecting elements of a scintillation counter. For best results, source 20 and the crystal of detector 26 are small compared to the dimensions of the collimating elements 21, 22, 27 and 28. Since the sensitivity of scintillation counting devices depends upon the exposed volume of crystal, there necessarily is a lower limit upon how small the crystal unit may be. In practice it has been found that a ½" diameter cylinder ½" long is suitable. The sizes of the source and detector are important insofar as they affect the source and detector collimation. Collimation is essential in order to limit measurement to gamma-rays singly scattered in the selected zone. This discrimination is provided by selecting the minimum angle $\theta$ for which gamma-rays will be admitted to the detecting window 29 and then limiting the measurements to such an energy band that doubly scattered gamma-rays and fluorescence X-rays are substantially eliminated. At the same time the energy level of the irradiating source is held below the range in which pair production might occur.

The three sources above noted fall within the desired range. Since the energy of the gamma-rays entering window 29 will depend upon their initial energy and upon the number of times scattered, singly scattered gamma-rays in general will have a much higher energy level than back-scattered gamma-rays. Thus a scintillation counter comprising the detector 26 and the measuring-discriminating circuit 15 may be adjusted to transmit to recorder 16 a signal dependent upon the number of singly scattered gamma-rays impinging detector 26.

More particularly, incident radiation, scattered radiation and the scattering angle are related in the following manner:

$$\gamma' = \frac{\gamma}{1+\gamma(1-\cos\theta)} \quad (3)$$

where $\gamma$ is the energy of the incident radiation; $\gamma'$ is the energy of the scattered radiation; and $\theta$ is the scattering angle.

Equation 3 is the Compton formula relating energy of scattered to incident quantum. For a given source energy and a given angle $\theta$, there will be a minimum energy level below which gamma-rays can reach the detector only after back-scattering and above which the gamma-rays will be dependent only upon single scattering. Equation 3 may also be expressed in terms of the angle $\phi$ subtended by the bands of incident and singly scattered gamma-rays as illustrated in Fig. 1 in the following manner:

$$\gamma' = \frac{\gamma}{1+\gamma(1+\cos\phi)} \quad (4)$$

where $\phi$ is the angle. The significance of distinguishing between singly scattered and back-scattered gamma-rays is that the number of singly scattered gamma-rays reaching the detector may be made substantially independent of variaions in borehole diameter as well as substantially independent of the character of borehole fluids, and therefore principally dependent upon the number of electrons per unit volume in the formations. This number is directly proportional to the physical density in grams per cubic centimeter of the formation. More particularly if the collimation angle and the spacing between windows 23 and 29 are properly selected, the zone in which gamma-rays can be singly scattered and still affect the measurements may be substantially removed from the borehole.

For example in Fig. 1 the volume having cross-sectional areas 31 is the only volume or zone in which gamma-rays can be singly scattered and still be measured by the detector 26. The borehole tool 10 may be moved from one bore hole wall to the other without the active zone 31 significantly approaching either the borehole proper or the formations invaded by drilling fluids.

It should be noted that gamma-rays which undergo double scattering may travel by way of path 32 all of which is in the borehole fluids. Gamma-rays of this nature, deterring prior art measurements, are eliminated from consideration in the instant invention by the lower probability of detection through use of collimation and may be further eliminated by energy discrimination.

In operation, a cesium source emitting gamma-rays of .662 m.e.v. and a scattering angle $\theta$ of 50° yields singly scattered gamma-rays having energy of .453 m.e.v., whereas doubly scattered gamma-rays will be in a range substantially less and thus readily eliminated from final measurements. If angle $\theta$ is 120°, all other things remaining unchanged, the received gamma-rays for single scattering will be of .225 m.e.v. with doubly scattered gamma-rays substantially lower in energy.

Figure 2:
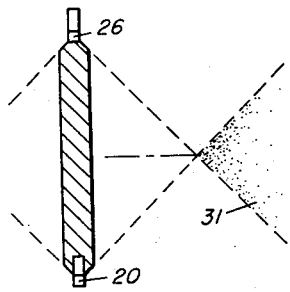
Fig. 2 illustrates a modification of a portion of the system of Fig. 1.

From the foregoing it will be appreciated that an important aspect of the invention is critical collimation of the front edge of the irradiating and detected beams. For example as shown in Fig. 2, radiation from source 20 can reach detector 26 after single scattering only in a volume whose cross-section is represented by the stippled area 31. It has been found that desirable results can be obtained using relatively simple front edge collimation as shown in Fig. 2, however the volume affecting measurements as restricted through collimation of both edges of the irradiating and detecting beams is desirable.

Figure 3:
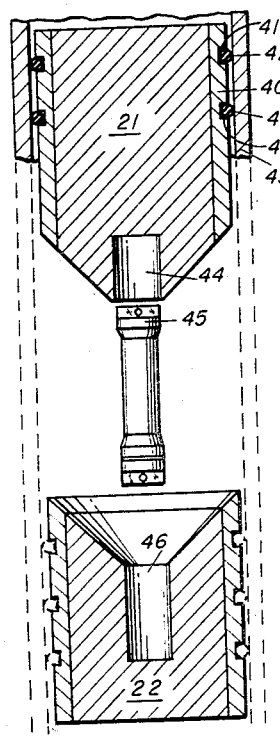
Fig. 3 is a detailed sectional exploded view of a collimating unit.

Sectional Fig. 3 illustrates an exploded source collimation device in detail. An upper member 21 includes an outer load bearing shell 40 of stainless steel having grooves 41 milled in the surface thereof to accommodate O-rings 42 which centers element 21 in an exploring tool pressure-bearing housing 43, only a portion of which has been shown in Fig. 3. The central portion of unit 21 comprises a heavy metal slug cast or otherwise secured to the outer shell 40. The heavy metal core preferably is made of tungsten although lead may be satisfactory. The lower end of unit 21 has a cone-shaped exterior with a cylindrical aperture 44 extending axially thereof. A holder 45 adapted to fit inside aperture 44 houses a selected mass of a radioactive element such as those above discussed. Preferably the source is positioned centrally in holder 45. Holder 45 may then extend into aperture 44 and into aperture 46 in the lower element 22. Element 22 is similar in construction to element 21 except that the interior surface of the upper end thereof is cone-shaped, preferably substantially complementary to the cone-shaped exterior of element 21. The length of the holder 45 and the depths of the apertures 44 and 46 are so related that when assembled, a window of desired width separates the conical faces of elements 21 and 22.

Theoretically, it is preferable to have the irradiating window very narrow or little more than a line in order to secure maximum definition. However, in order to assure a counting rate with the detector adequate to permit any measurements at all, it is necessary to leave a substantial area of the detector exposed. For this reason the window on the detector end of the system has been found to be satisfactory when of the order of ½" wide. The detector may be shielded in manner similar to the source shielding means shown in Fig. 3.

Figure 4:
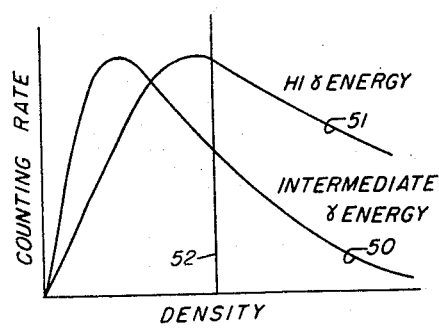
Fig. 4 is a graph to show a desirable operating energy range.

The energy level of the source is important because proper selection thereof determines the formation density resolution possible. As shown in Fig. 4, the counting rate has been plotted as a function of the density of earth materials for intermediate energy gamma-rays and for relatively high energy gamma-rays. The range of gamma-ray energies exemplified by the intermediate energy curve 50 corresponds to those above discussed, cesium 137, cobalt 60 and mercury 203. The high energy curve 51 corresponds to the use of gamma-rays in the order of 10 m.e.v. or greater. It is readily apparent that upon operation in the region of the curve represented by the line 52, a given change in formation density will yield a substantially greater change in counting rate than when using a high energy irradiating source.

Figure 5:
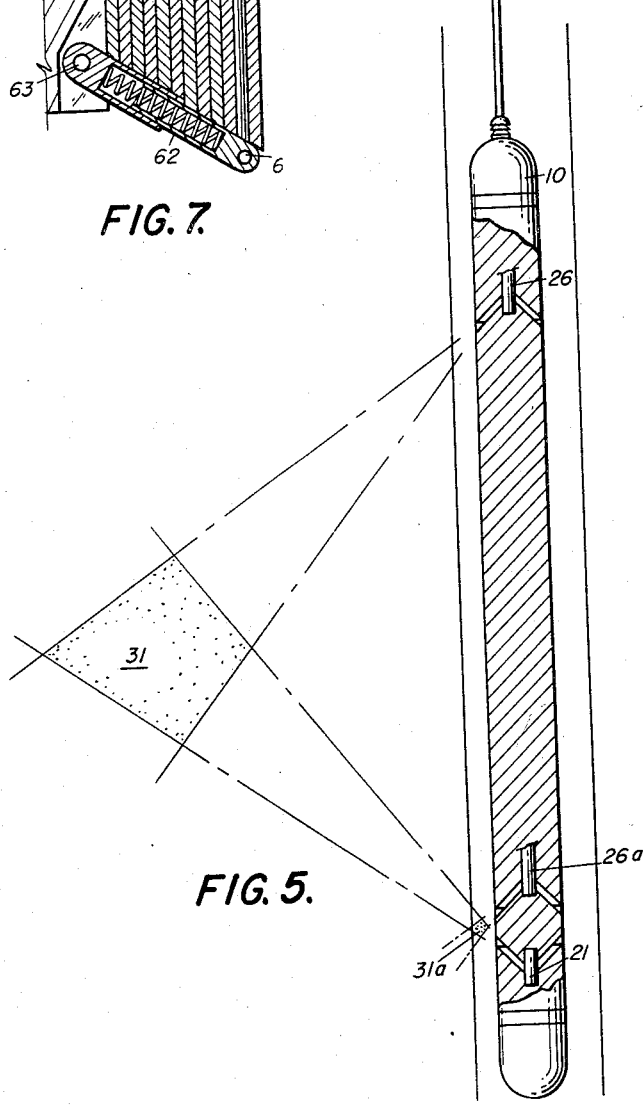
Fig. 5 is a modification of Fig. 1.

Fig. 5 illustrates that density measurements in accordance with the present invention need not be confined to the properties of the formations. Fig. 5 includes source 21 and detector 26 oriented as in Fig. 1 in order to measure the properties of that volume of earth material having a cross-sectional area 31. Also included in Fig. 5 is a second detector 26a positioned close to source 21 so that measurements are affected by that volume having the cross-sectional area 31a. It will be appreciated that the volume of material under study will be determined by the spacing between source and detector and by the collimation angles. In Fig. 5 the only change as between detectors 26 and 26a is in the spacing. It should be noted that unit 10 positioned against the wall of a borehole or centered therein senses properties of a limited active volume in the immediate vicinity of the unit. It may be desirable to incorporate such detecting units in a single logging tool as shown in Fig. 5 simultaneously to measure density of the fluids or conditions as to cementing and density of the formations along the length of a borehole.

Figure 7:
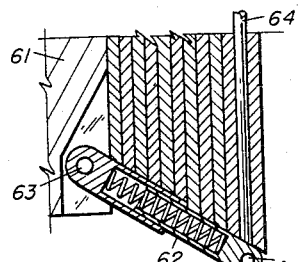
Fig. 7 is a detailed view of a portion of Fig. 6.
Figure 6:
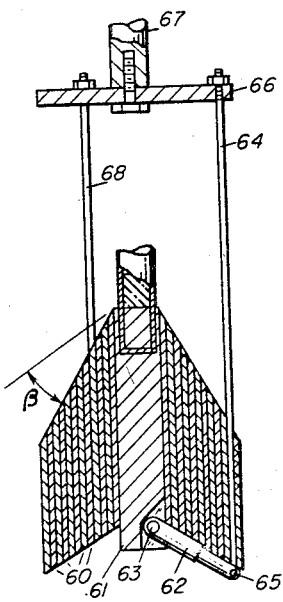
Fig. 6 is a detailed sectional view of an angular adjustable collimating unit.

In Figs. 6 and 7 shielding means with adjustable collimation has been shown. In use, the logging tool might be stopped in each distinctive geologic section and the collimation angle β changed either stepwise or continuously to secure a lateral log of density, i.e., density as a function of distance from the borehole. Such adjustable collimation means may comprise a series of coaxial cylinders 60 positioned as to encase one another and a core 61. A telescoping lever arm 62, shown in detail in Fig. 7, is pivoted at the lower end of the central member or core 61 as on a shaft 63. The outer end of the arm 62 is secured to a control rod 64 as by shaft 65. The upper end of rod 64 is fastened to a disk or plate 66 which in turn is coupled to an actuating rod 67. Since Fig. 6 is a sectional view only, a single lever 62 has been shown but it is to be understood that three such arms may be provided, along with three control rods such as rod 64. For example, in Fig. 6 a second rod 68 may be seen, it being arranged to actuate an arm such as arm 62. The actuating rod 67 may be motor driven or may be solenoid driven such as to vary the relative positions of the shielding sleeves 60 thereby to vary the effective angle β. It is to be understood that as angle β is varied, the lower threshold of the measuring system 15 will be adjusted. For example when θ=50°, gamma-rays from a cesium 137 source after single scattering will be in an energy band at about .453 m.e.v., whereas when θ=120°, the corresponding band would be at about .225 m.e.v. The energy of singly scattered gamma-rays is a collimation angle dependent function.

In the modification illustrated in Figs. 8 and 9 the gamma-ray source 100 is mounted at the axis of the borehole unit 101. A port or window 102 is provided in one side of the unit 101 for emanation of radiations from source 100. Window 102, viewed from the side as in Fig. 8, has the same dimensions and slope as in Figs. 1 and 5. However, the window, viewed in Fig. 9, is limited to angle β of about 30° to 60° whereby the radiation to the formations will be limited substantially to the latter angle. The detector 104 similarly is mounted inside the unit 101 with the crystal 105 being mounted at the center of a limited port or window 106 whose dimensions may conveniently correspond with those of the window 102.

A bow spring 107 is mounted on the periphery of the unit 101 diametrically opposite the center of the opening or window 102 and serves to force the windows such as window 102 against the formation face, thereby to maintain at a minimum interference introduced by double scattered gamma-rays reaching the detector. It has been found that use of a system such as shown in Figs. 8 and 9 is more definitive of the properties of interest in the formations than systems using collimation by conical-shaped windows such as shown in Figs. 1 and 5. In many instances it will therefore be desirable to provide the limited collimation of source and detector together with the bow spring device and a detecting system that is energy selective in order clearly to delineate variations in density of the earth formations. This is particularly true where substantial variations in borehole diameter are encountered.

It will now be seen that a preferred system includes a source of gamma-rays of intermediate energy and a detector element responsive to gamma-rays. A heavy metal shielding means separates the elements shielding them one from the other and providing beveled surfaces adjacent the elements, the geometrical projections of which intersect in the material to be studied. Thus singly scattered gamma-rays only can impinge the detector with energies within a predetermined band. It has been shown that such gamma-rays are indicative of the density of the scattering material. More particularly, the following table portrays the absorption coefficient (A) of different scattering materials and the percent difference between the Compton and actual density in the region where Compton scattering predominates.

| Substance | A | Percent Difference Between Compton and Actual Density |
|---|---|---|
| Carbon (C) | .500 | 0.0 |
| Hydrogen (H) | .992 | 98.4 |
| Oxygen (O) | .500 | 0.0 |
| Silicon (Si) | .499 | −0.2 |
| Aluminum (Al) | .482 | −3.6 |
| Iron (Fe) | .466 | −6.8 |
| Calcium (Ca) | .499 | −0.2 |
| Sodium (Na) | .478 | −4.4 |
| Potassium (K) | .486 | −2.8 |
| Magnesium (Mg) | .493 | −1.4 |
| Titanium (Ti) | .459 | −8.2 |
| Nitrogen (N) | .500 | 0.0 |
| Silicon Dioxide (SiO₂) | .500 | 0.0 |
| Calcium Carbonate (CaCO₃) | .500 | 0.0 |
| Water (H₂O) | .554 | 10.8 |
| Carbon Tetrachloride (CCl₄) | .481 | −3.8 |
| Barium Sulphate (BaSO₄) | .446 | −10.8 |
| Average Shale | .498 | −0.4 |
| Average Sandstone | .499 | −0.2 |
| Average Limestone | .499 | −0.2 |
| Average over Earth's Crust | .4993 | −0.1 |
| Average Crude | .563 | 12.6 |

From the foregoing table it is clear that measurements of Compton scattering vary in substantially the same manner as does density for most materials encountered in the earth's sedimentary section.

While this invention has been illustrated and described in such detail as to enable one skilled in the art to make and use the same, it is to be understood that modifications may now suggest themselves to those skilled in the art and it is intended to cover such modifications as fall within the scope of the appended claims.

What is claimed is:

1. A system for determining the density of materials which comprises a source element of gamma-rays of intermediate energy $\gamma$, a detector element for producing electrical signals upon reception of gamma-rays, heavy metal shielding means separating said elements having beveled surfaces adjacent said elements the geometrical projections of which intersect at a point in said material displaced from a straight line connecting said source element and detector element wherein gamma-rays from said source singly scattered in said material adjacent said point impinge said detector with energies within a band which is dependent upon the angle subtended by said projections and whose median energy $\gamma'$ is related to said angle by the expression $$\gamma' = \frac{\gamma}{1+\gamma(1+\cos\phi)}$$

where $\phi$ is the angle subtended by said projections, and an energy selective measuring system connected to said detector element and selectively responsive primarily to signals corresponding to gamma-rays of energies within said band.

2. A well logging system for determining the density of materials in formations spaced laterally from the walls of a well bore comprising a source element of gamma-rays of intermediate energy $\gamma$ supported for movement along the length of said well bore, a detector element supported with and spaced a predetermined distance from said source element for producing electrical signals upon reception of gamma-rays, shielding means substantially encasing both said elements but having restricted apertures angularly directed towards the formations and arranged such that geometrical projections thereof intersect at points displaced from said well bore to define an active zone, wherein gamma-rays from said source singly scattered in said zone impinge said detector with energies within a band dependent upon the angle $\phi$ subtended by said projections which band is centered at an energy $\gamma'$ related to said angle by the expression $$\gamma' = \frac{\gamma}{1+\gamma(1+\cos\phi)}$$

and an energy selective measuring system connected to said detector and adapted to accept for measurement primarily signals corresponding to gamma-rays of energy within said band.

3. A well logging system for determining the density of materials in formations adjacent the walls of a well bore comprising a gamma-ray source of intermediate energy $\gamma$ sharply collimated to form a primary beam of gamma-rays in said formations, means supporting said source for movement along the length of said well bore, a detector element supported with and spaced a predetermined distance from said source and sharply collimated to receive a secondary beam of gamma-rays of lower energy $\gamma'$, where the paths of said beams intersect to subtend an angle $\phi$, where $\phi$ is the supplement of the scattering angle $\theta$, and a measuring system connected to said detector and selectively responsive to signals corresponding to gamma-rays within a restricted energy band including the energy $\gamma'$, where $$\gamma' = \frac{\gamma}{1+\gamma(1-\cos\theta)}$$

4. A well logging system for determining the density of materials in formations adjacent the walls of a well bore comprising a gamma-ray source of intermediate energy $\gamma$, means for sharply collimating said source to form a cone-shaped beam of gamma-rays in said formations, means supporting said source for movement along the length of said well bore, a detector element supported with and spaced a predetermined distance from said source, means for sharply collimating said detector element to receive a cone-shaped beam of gamma-rays of lower energy $\gamma'$, where the paths of said beams intersect to subtend an angle $\phi$ where $\phi$ is the supplement of the scattering angle $\theta$, and a measuring system connected to said detector and selectively responsive signals corresponding to gamma-rays within a restricted energy band including the energy $\gamma'$ where $$\gamma' = \frac{\gamma}{1+\gamma(1-\cos\theta)}$$

5. A well logging system for determining the density of materials in an annular zone substantially symmetrical to a well bore comprising an element forming a source of gamma-rays of intermediate energy $\gamma$ supported for movement along the length of said well bore, a detector element supported with and spaced a predetermined distance from said source for producing electrical signals upon reception of gamma-rays, shielding means substantially encasing both said elements and having a conical-shaped aperture adjacent each of said elements whose geometrical projections intersect to define an active zone in which gamma-rays following single scattering will be within an energy band dependent upon and related to the angle $\phi$ subtended by said projections by the expression $$\gamma' = \frac{\gamma}{1+\gamma(1+\cos\phi)}$$

where $\gamma'$ represents an energy level within said band, and a measuring system connected to said detector and adapted to accept for measurement primarily signals corresponding to gamma-rays of energy within said band.

6. A well logging system comprising an elongated pressure-bearing housing, a gamma-ray source of intermediate energy $\gamma$ at one end thereof, a detector element spaced substantially from said source, heavy metal cylinder means partially encasing said source and said detector axially of said housing, said cylinder means adapted to provide cone-shaped slots which intersect said source and detector and whose projections extend at an angle relative to the axis of said housing for intersection at a point displaced from said housing to define an active zone in which gamma-rays from said source are singly scattered and directed to said detector, cable means for supporting said unit for movement along said well bore and including a circuit connected to said detector, a measuring system connected to said circuit at the earth's surface and selectively responsive to signals from said detector corresponding to gamma-rays lying within a restricted energy band which includes energy $\gamma'$, where $$\gamma' = \frac{\gamma}{1+\gamma(1-\cos\theta)}$$

where $\gamma$ is the energy of rays from said source and $\theta$ is the scattering angle of the gamma-rays in said zone.

7. The system for determining the density of materials which comprises a source of gamma-rays of intermediate energy $\gamma$, a detector element for producing electrical signals upon reception of gamma-rays, an elongated pressure-bearing cylinder for housing said source and detector in a predetermined spaced apart relation, solid elongated cylindrical means formed of heavy metal positioned intermediate said source and detector in said housing and having cone-shaped ends adjacent said source and said detector the projections of which intersect at a point outside said elongated housing whereby gamma-rays from said source singly scattered in the region subtended by the intersection of said projections impinge said detector with energy dependent upon and related to the angle $\phi$ subtended by said projections by the expression $$\gamma' = \frac{\gamma}{1+\gamma(1+\cos\phi)}$$

where $\gamma'$ represents an energy level within said band, and a measuring system connected to said detector selectively responsive primarily to signals corresponding to gamma-rays of said energy.

8. A gamma-ray well logging system for determining the density of materials adjacent the walls of a well bore which comprises an elongated cylindrical housing, cable means including an electrical circuit supporting said housing for movement along the length of a well bore, a heavy metal cylindrical means supported within said housing and provided with at least two conical-shaped windows adjacent the ends thereof whose projections intersect at points outside said housing, a source of gamma-rays at the axis of said cylinder and in a first of said windows, a detector of gamma-rays at the axis of said cylinder and in the second of said windows, means for connecting said detector to said electrical circuit, and a measuring system connected to said cable means at the earth's surface and responsive to the output of said detector and further characterized by selectivity primarily responsive to gamma-rays in an energy band dependent upon and related to the angle $\phi$ between said projections by the expression $$\gamma' = \frac{\gamma}{1+\gamma(1+\cos\phi)}$$

where $\gamma$ represents the energy level of gamma-rays from said source and where $\gamma'$ represents an energy level within said band.

9. The method of determining the density of materials in a region adjacent the walls of a borehole which comprises irradiating with incident gamma-rays of intermediate energy $\gamma$ materials in a zone subtended by the projections of a pair of oppositely directed cone-shaped surfaces having cylindrical symmetry with respect to said borehole, generating a signal in response to the reception in said borehole of gamma-rays of energy $\gamma'$ singly scattered in said zone and related to the energy of incident gamma-rays and the paths of incident and scattered gamma-rays by the following expression $$\gamma' = \frac{\gamma}{1+\gamma(1+\cos\phi)}$$

where $\phi$ is the angle subtended by the paths of incident and singly scattered gamma-rays, and recording said signal as a function of depth of said zone.

References Cited in the file of this patent

UNITED STATES PATENTS

| | | |
|---|---|---|
| 2,316,361 | Piety | Apr. 13, 1943 |
| 2,469,461 | Russell | May 10, 1949 |
| 2,727,155 | Herzog | Dec. 13, 1955 |
| 2,763,788 | Herzog | Sept. 18, 1956 |
| 2,769,918 | Tittle | Nov. 6, 1956 |

UNITED STATES PATENT OFFICE

CERTIFICATE OF CORRECTION

Patent No. 2,934,652                           April 26, 1960

Richard L. Caldwell et al.

It is hereby certified that error appears in the printed specification of the above numbered patent requiring correction and that the said Letters Patent should read as corrected below.

Column 1, line 14, following the heading to the printed specification, the following paragraph should be inserted:

> This invention relates to borehole logging and more particularly to the measurement of gamma-rays of selected energy level singly scattered in a restricted predetermined zone for determination of the density of materials therein. This application is a continuation-in-part of the application of Richard L. Caldwell et al., Serial No. 440,788, filed July 1, 1954, for SELECTED SCATTERED GAMMA-RAY DENSITY LOGGING, now abandoned.

same column 1, line 70, for "angular" read -- angularly --; column 4, line 19, for "bore hole" read -- borehole --; column 6, line 8, after "to", first occurrence, insert -- an --; column 7, line 45, column 8, lines 29 and 74, column 9, line 25, and column 10, line 15, after the formula, each occurrence, insert a comma; column 7, line 68 and column 8, line 12, after the formula, each occurrence, insert a period.

Signed and sealed this 1st day of November 1960.

(SEAL)
Attest:

KARL H. AXLINE                                 ROBERT C. WATSON
Attesting Officer                          Commissioner of Patents Notice of Adverse Decision in Interference In Interference No. 91,427 involving Patent No. 2,934,652, R. L. Caldwell, G. L. Hoehn, Jr., and T. W. Bonner, Selected scattered gamma-ray density logging, final judgment adverse to the patentees was rendered Sept. 10, 1964, as to claims 1, 2, 3, 4, 5, 6 and 8.

[*Official Gazette October 27, 1964.*]

Disclaimer 2,934,652.—*Richard L. Caldwell*, Dallas, Tex., *Gustave L. Hoehn, Jr.*, Palo Alto, Calif., and *Tom W. Bonner*, Houston, Tex. SELECTED SCATTERED GAMMA-RAY DENSITY LOGGING. Patent dated Apr. 26, 1960. Disclaimer filed Oct. 16, 1964, by the assignee, *Socony Mobil Oil Company, Inc.*

Hereby enters this disclaimer to claims 1, 2, 3, 4, 5, 6 and 8 of said patent.
[*Official Gazette January 19, 1965.*]